(12) United States Patent
Hajji et al.

(10) Patent No.: US 12,203,014 B2
(45) Date of Patent: *Jan. 21, 2025

(54) (METH)ACRYLIC COMPOSITION, ITS METHOD OF PREPARATION AND ITS USE

(71) Applicant: Arkema France, Colombes (FR)

(72) Inventors: Philippe Hajji, Chatillon d'Azergues (FR); Rosangela Pirri, Montardon (FR); Rabi Inoubli, Villeurbanne (FR); Guillaume Michaud, Compiegne (FR)

(73) Assignee: ARKEMA FRANCE, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/864,742

(22) Filed: Jul. 14, 2022

(65) Prior Publication Data

US 2022/0363949 A1 Nov. 17, 2022

Related U.S. Application Data

(62) Division of application No. 16/628,295, filed as application No. PCT/EP2018/069041 on Jul. 12, 2018, now Pat. No. 11,390,776.

(30) Foreign Application Priority Data

Jul. 12, 2017 (FR) ..................... 17.56649

(51) Int. Cl.
  *C09J 4/06* (2006.01)
  *C09J 133/12* (2006.01)

(52) U.S. Cl.
  CPC .............. *C09J 4/06* (2013.01); *C09J 133/12* (2013.01)

(58) Field of Classification Search
  CPC ...... C09J 133/08; C09J 133/10; C09J 133/12; C09J 131/02
  See application file for complete search history.

(56) References Cited

U.S. PATENT DOCUMENTS

| | | | |
|---|---|---|---|
| 3,929,722 A * | 12/1975 | Bak | C08L 51/04 525/76 |
| 4,764,555 A | 8/1988 | Shigemitsu et al. | |
| 6,433,091 B1 | 8/2002 | Cheng | |
| 6,462,126 B1 * | 10/2002 | Gosiewski | C09J 133/06 525/261 |
| 8,729,197 B2 | 5/2014 | Kropp | |
| 9,074,112 B2 * | 7/2015 | Osae | C09J 123/286 |
| 11,390,776 B2 * | 7/2022 | Hajji | C09J 133/12 |
| 2004/0077766 A1 * | 4/2004 | De Cooman | C09J 4/06 524/458 |
| 2007/0027233 A1 | 2/2007 | Yamaguchi et al. | |
| 2007/0027263 A1 | 2/2007 | Furukawa et al. | |
| 2009/0308534 A1 | 12/2009 | Malone | |
| 2010/0099800 A1 | 4/2010 | Ueno et al. | |
| 2011/0024039 A1 | 2/2011 | Campbell et al. | |
| 2012/0157628 A1 | 6/2012 | Navarro et al. | |
| 2012/0302695 A1 * | 11/2012 | Osae | C09J 123/286 528/73 |
| 2017/0369696 A1 | 12/2017 | Inoubli et al. | |
| 2018/0002520 A1 | 1/2018 | Inoubli et al. | |

FOREIGN PATENT DOCUMENTS

| | | |
|---|---|---|
| CN | 105419661 A | 3/2016 |
| EP | 0 066 382 A1 | 12/1982 |
| FR | 2934866 A1 | 2/2010 |
| WO | WO2016102666 A1 | 6/2016 |

* cited by examiner

*Primary Examiner* — John M Cooney
*Assistant Examiner* — Jeffrey S Lenihan
(74) *Attorney, Agent, or Firm* — Boone IP Law

(57) ABSTRACT

The present invention relates to a composition suitable as (meth)acrylic adhesive composition comprising a multistage polymer in form of polymeric particles and a (meth)acrylic polymer, its process of preparation, and its use. In particular the present invention relates to a structural (meth)acrylic adhesive composition comprising a multistage polymer in form of polymeric particles made by a multistage process and a (meth)acrylic polymer, its process of preparation and its use. More particularly the present invention relates to structural (meth)acrylic adhesive composition made from a two part composition comprising a multistage polymer in form of polymeric particles made by a multistage process and a (meth)acrylic polymer, its process of preparation, and its use.

17 Claims, No Drawings

(METH)ACRYLIC COMPOSITION, ITS METHOD OF PREPARATION AND ITS USE

CROSS-REFERENCE TO RELATED APPLICATIONS

This application is a divisional of U.S. patent application Ser. No. 16/628,295, filed Jan. 3, 2020, which is a national stage application under 35 U.S.C. § 371 of PCT/EP2018/069041, filed Jul. 12, 2018 which claims benefit to application FR17.56649, filed Jul. 12, 2017.

FIELD OF INVENTION

The present invention relates to a composition suitable as (meth)acrylic adhesive composition comprising a multistage polymer in form of polymeric particles and a (meth)acrylic polymer, its process of preparation, and its use.

In particular the present invention relates to a structural (meth)acrylic adhesive composition comprising a multistage polymer in form of polymeric particles made by a multistage process and a (meth)acrylic polymer, its process of preparation and its use.

More particularly the present invention relates to structural (meth)acrylic adhesive composition made from a two part composition comprising a multistage polymer in form of polymeric particles made by a multistage process and a (meth)acrylic polymer, its process of preparation, and its use.

Technical Problem

Structural adhesives are materials of high strength and performance. Their function is primary function is to hold structures together and to be capable of resisting to high loads.

Thermosetting acrylic adhesives are rubber-toughened systems that cure rapidly at room temperature to provide a crosslinked structural adhesive suitable for bonding metals, engineering plastics, composites and many other substrates with minimal surface preparation. The two materials to be bonded can be of different nature.

They provide a high tensile shear and peel strength, chemical resistance, and impact strength. These formulations generally use the addition of core-shell, block and graft polymers, which may swell in size in the adhesive formulation but do not dissolve. These additives give also improved spreading and flow properties to the adhesive.

The core-shell polymer has to be distributed homogeneously throughout the adhesive in order to guaranty a satisfying impact performance of the adhesive. This homogenous distribution is not easily achieved with all kind of core shell impact modifiers.

Additionally the elongation at break is relatively low for standard acrylic structural adhesives.

The adhesion of such acrylic structural adhesives should be increased as well.

The objective of the present invention is to propose a multistage polymer composition which is rapidly and easily dispersible in liquid and/or reactive resins suitable for (meth)acrylic adhesive compositions.

An objective of the present invention is also to propose a multistage polymer composition which is easily dispersible in liquid and/or reactive resins in form of a polymer powder suitable for (meth)acrylic adhesive compositions.

An additional objective of the present invention is to propose structural adhesive polymer composition that has good compromise between a good tensile strength and a high elongation at break.

An additional objective of the present invention is to propose structural adhesive polymer composition that has satisfying impact performance and a high tensile strength, while having at the same time an increased adhesion as measured by the shear strength (lap shear test).

Another objective of the present invention is to propose a method for structural adhesive polymer composition which comprises a multistage polymer (MP1) having a core-shell structure, that is easily dispersible in in liquid and/or reactive resins.

Still a further objective of the present invention is the use of a liquid polymer composition comprising a multistage polymer having a core-shell structure, with a homogenous distribution of the multistage polymer for preparing structural (meth)acrylic adhesive.

BACKGROUND OF THE INVENTION

Prior Art

The document WO2013/126377 discloses a structural acrylic adhesive. The adhesive can comprise toughening agents.

The document WO02/076620 discloses an easy to manufacture (meth)acrylic adhesive composition. The composition comprises core shell impact modifiers that are dispersed in order to insure a high impact resistance.

The document US2012/0252978 discloses a composition for a structural adhesive. The composition is based on acrylates and methacrylates and comprises as well elastomeric block copolymers and elastomeric polymeric particles.

The document US2012/0302695 discloses a methacrylate-based adhesive compositions comprising core shell impact modifiers.

None of the prior art documents discloses a (meth)acrylic adhesive composition comprising a multistage polymer in form of polymeric particles combined with a (meth)acrylic polymer having a specific molecular weight.

BRIEF DESCRIPTION OF THE INVENTION

Surprisingly it has been found that a composition comprising
a) a first part composition (P1) comprising
  a1) at least one (meth)acrylic monomer (M1),
  a2) a multistage polymer (MP1) having a core-shell structure,
  a3) a polymer (C1), and
b) a second part composition (P2) comprising
  b1) a polymerization initiator, characterized in that the polymer (C1) is having a mass average molecular weight Mw between 2 000 g/mol and 1 000 000 g/mol, is suitable as (meth)acrylic adhesive composition.

Surprisingly it has been found that a composition comprising
a) a first part composition (P1) comprising
  a1) at least one (meth)acrylic monomer (M1),
  a2) a multistage polymer (MP1) having a core-shell structure,
  a3) a polymer (C1), and b) a second part composition (P2) comprising
  b1) a polymerization initiator,
characterized in that the polymer (C1) is having a mass average molecular weight Mw between 2 00 g/mol and 1 000 000 g/mol, yields to a (meth)acrylic adhesive composition having increase elongation at break and shear strength adhesion.

Surprisingly it has also been found that a a method for manufacturing the polymer composition suitable as (meth) acrylic adhesive composition comprising the steps of
  (a) providing a first part composition (P1) comprising
    a1) at least one (meth)acrylic monomer (M1),
    a2) a multistage polymer (MP1) having a core-shell structure,
    a3) a polymer (C1);
  (b) providing a second part composition (P2) comprising
    b1) a polymerization initiator
  (c) polymerizing the mixture of (P1) and (P2)
characterized in that the polymer (C1) is having a mass average molecular weight Mw between 2 000 g/mol and 1 000 000 g/mol, yields to a (meth)acrylic adhesive composition having increase elongation at break and shear strength adhesion.

Surprisingly it has also been found that a polymer composition comprising
  a) a first part composition (P1) comprising
    a1) at least one (meth)acrylic monomer (M1),
    a2) a multistage polymer (MP1) having a core-shell structure,
    a3) a polymer (C1), and
  b) a second part composition (P2) comprising
    b1) a polymerization initiator,
characterized in that the polymer (C1) is having a mass average molecular weight Mw between 2 000 g/mol and 1 000 000 g/mol, can be used for (meth)acrylic adhesive composition having increase elongation at break and shear strength adhesion.

DETAILED DESCRIPTION OF THE INVENTION

According to a first aspect, the present invention relates to a composition suitable as (meth)acrylic adhesive composition comprising
  a) a first part composition (P1) comprising
    a1) at least one (meth)acrylic monomer (M1),
    a2) a multistage polymer (MP1) having a core-shell structure,
    a3) a polymer (C1), and
  b) a second part composition (P2) comprising
    b1) a polymerization initiator,
characterized in that the polymer (C1) is having a mass average molecular weight Mw between 2 000 g/mol and 1 000 000 g/mol.

According to a second aspect, the present invention relates to a method for manufacturing the polymer composition suitable as (meth)acrylic adhesive composition comprising the steps of
  (a) providing a first part composition (P1) comprising
    a1) at least one (meth)acrylic monomer (M1),
    a2) a multistage polymer (MP1) having a core-shell structure,
    a3) a polymer (C1);
  (b) providing a second part composition (P2) comprising
    b1) a polymerization initiator
  (c) polymerizing the mixture of (P1) and (P2)
characterized in that the polymer (C1) is having a mass average molecular weight Mw between 2 000 g/mol and 1 000 000 g/mol.

In a third aspect the present invention relates to a structural adhesive polymer composition comprising
  a) a first part composition (P1) comprising
    a1) at least one (meth)acrylic monomer (M1),
    a2) a multistage polymer (MP1) having a core-shell structure,
    a3) a polymer (C1), and
  b) a second part composition (P2) comprising
    b1) a polymerization initiator,
characterized in that the polymer (C1) is having a mass average molecular weight Mw between 2 000 g/mol and 1 000 000 g/mol.

In a fourth aspect the present invention relates to the use of a polymer composition comprising
  a) a first part composition (P1) comprising
    a1) at least one (meth)acrylic monomer (M1),
    a2) a multistage polymer (MP1) having a core-shell structure,
    a3) a polymer (C1), and
  b) a second part composition (P2) comprising
    b1) a polymerization initiator, as structural adhesive.

By the term "polymer powder" as used is denoted a polymer comprising powder grain in the range of at least 1 μm obtained by agglomeration of primary polymer comprising particles in the nanometer range.

By the term "primary particle" as used is denoted a spherical polymer comprising particle in the nanometer range. Preferably the primary particle has a weight average particle size between 20 nm and 800 nm.

By the term "particle size" as used is denoted the volume average diameter of a particle considered as spherical.

By the term "thermoplastic polymer" as used is denoted a polymer that turns to a liquid or becomes more liquid or less viscous when heated and that can take on new shapes by the application of heat and pressure.

By the term "thermosetting polymer" as used is denoted a polymer that is irreversibly into an infusible, insoluble polymer network after curing.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth)acrylic" as used is denoted all kind of acrylic and methacrylic monomers.

By the term "(meth)acrylic polymer" as used is denoted that the (meth)acrylic polymer comprises essentially polymers comprising (meth)acrylic monomers that make up 50 wt % or more of the (meth)acrylic polymer.

By the term "dry" as used is denoted that the ratio of residual water is less than 1.5 wt % and preferably less than 1 wt %.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

With regard to the polymeric composition according to the invention, it is a two part acrylic adhesive composition that comprises a first part composition (P1) and a second part composition (P2).

The first part (P1) comprises at least the following components: a1) at least one (meth)acrylic monomer (M1), a2) a multistage polymer (MP1) having a core-shell structure and a3) a polymer (C1).

The (meth)acrylic monomer(s) (M1) may represent at least 20 wt % of the sum of all components of the first part composition (P1). The (meth)acrylic monomer(s) (M1) may represent at most 75 wt % of the sum of all components of the first part composition (P1).

The multistage polymer (MP1) may represent at least 5 wt % of the sum of all components of the first part composition (P1). The multistage polymer (MP1) may represent at most 75 wt % of the sum of all components of the first part composition (P1).

In one embodiment, the multistage polymer(s) (MP1) represent(s) from 10 wt % to 20 wt %, preferably from 12 wt % to 20 wt %, more preferably from 13 wt % to 18 wt %, advantageously from 15 wt % to 18 wt % of the sum of all components of the first part composition (P1).

The polymer (C1) may represent at least 1 wt % of the sum of all components of the first part composition (P1).

Moreover, the first part composition (P1) may optionally comprisesone or more additional compounds, in particular selected from the group consisting of:
- at least one monomer (M2) different from (meth)acrylic monomer (M1) as defined above;
- a flexibilizer;
- a polymerization accelerator;
- an adhesion promoter;
- a filler;
- a rheology modifier;
- and their mixtures.

The second part composition (P2) comprises at least b1) a polymerization initiator.

Moreover, the second part composition (P2) may optionally comprise one or more additional compounds, in particular selected from the group consisting of:
- a (meth)acrylic monomer (M3);
- a diluent (non-reactive diluent or reactive diluent);
- a plasticizer;
- an adhesion promoter;
- a rheology modifier;
- a filler;
- and their mixtures.

With regard to the (meth)acrylic monomer (M1) according to the invention, it may be chosen from a methacrylic monomer or an acrylic monomer or a mixture thereof.

The (meth)acrylic monomer (M1) is preferably chosen from acrylic acid, methacrylic acid, acrylic ester monomers, methacrylic ester monomers and mixtures thereof.

Preferably (meth)acrylic monomer (M1) is chosen from acrylic acid, methacrylic acid, alkyl acrylic monomers, alkyl methacrylic monomers and mixtures thereof, the alkyl group having from 1 to 22 carbons, either linear, branched or cyclic; preferably the alkyl group having from 1 to 12 carbons, either linear, branched or cyclic.

Advantageously, the (meth)acrylic monomer (M1) is chosen from methyl methacrylate, ethyl methacrylate, methyl acrylate, ethyl acrylate, methacrylic acid, acrylic acid, n-butyl acrylate, iso-butyl acrylate, n-butyl methacrylate, iso-butyl methacrylate, cyclohexyl acrylate, cyclohexyl methacrylate, isobornyl acrylate, isobornyl methacrylate, allyl acrylate, allyl methacrylate, n-propyl acrylate, n-propyl methacrylate, n-hexyl acrylate, n-hexyl methacrylate, 2-ethylhexyl acrylate, 2-ethylhexyl methacrylate, n-octyl acrylate, n-octyl methacrylate, n-decyl acrylate, n-decyl methacrylate, n-dodecyl acrylate, n-dodecyl methacrylate, tridecyl acrylate, tridecyl methacrylate, and mixtures thereof.

For example, mention may be made of SR 286 and SR 489 commercialized by SARTOMER:

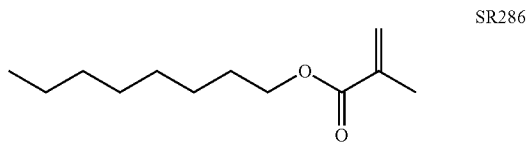

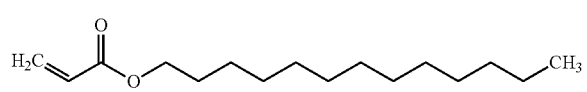

In a preferred embodiment at least 50 wt %, preferably at least 60 wt % of the (meth)acrylic monomer (M1) is methyl methacrylate.

The (meth)acrylic monomer(s) (M2) is (are) different from the (meth)acrylic monomer (M1).

The (meth)acrylic monomer (M2) may be chosen from acrylic ester monomers or methacrylic ester monomers that have at least one atom that is not a carbon or hydrogen in the group of the alcohol part of the ester (not taking into account the atoms of the ester group itself). Preferably the atom is oxygen. An example is hydroxyl ethyl methacrylate or polyether chains comprising acrylic momoners.

(Meth)acrylic monomer (M2) are for example chosen from the group consisting of: 2-hydroxyethyl acrylate, 2-hydroxyethyl methacrylate, 2- and 3-hydroxypropyl acrylate, 2- and 3-hydroxypropyl methacrylate, 2-methoxyethyl acrylate, 2-methoxyethyl methacrylate, 2-ethoxyethyl acrylate, 2-ethoxyethyl methacrylate, 2- or 3-ethoxypropyl acrylate, 2- or 3-ethoxypropyl methacrylate, 2(2-ethoxyethoxy)ethyl acrylate, methoxy polyethylene glycol methacrylate (preferably comprising 2 to 8 repeating (EO) units), methoxy polyethylene glycol acrylate preferably comprising 2 to 8 repeating (EO) units), polyethylene glycol methacrylate preferably comprising 2 to 8 repeating (EO) units), polyethylene glycol acrylate preferably comprising 2 to 8 repeating (EO) units), polypropylene glycol methacrylate preferably comprising 2 to 8 repeating (EO) units), polypropylene glycol acrylate preferably comprising 2 to 8 repeating (EO) units, and mixtures thereof.

Mention may be made for example of SR 550 and SR 256 commercialized by SARTOMER

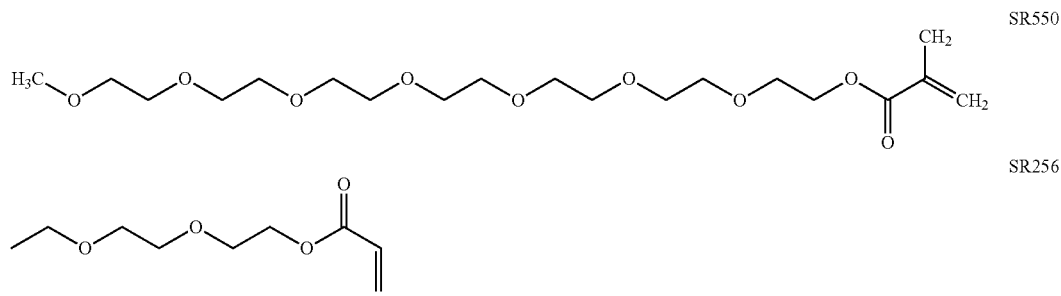

The (meth)acrylic monomer (M3) can be the same as the (meth)acrylic monomer (M1).

In a first preferred embodiment, the (meth)acrylic monomer (M3) is methyl methacrylate.

With regard to the flexibiliser according to the invention, it may be chosen from block copolymer, for example chosen from styrene block copolymer (SBC) and styrene-isoprene-styrene (SIS).

The flexibilizer can also be chosen from a liquid elastomer. The liquid elastomer may have a weight average molecular weight Mw in the range of 1000 g/mol to 100 000 g/mol, preferably of 1000 g/mol to 15 000 g/mol, more preferably of 1000 g/mol to 9000 g/mol and may functionalized with ethylenically unsaturated groups.

In a first preferred embodiment, the liquid elastomer is chosen from urethanes oligomers. Preferably the urethane oligomers comprise at least two double bonds, preferably from 2 to 9 two double bonds. Preferably the double bonds are part of an acryl group, a methacryl group or an allyl group.

In a preferred embodiment, the flexibilizer is chosen from the urethane (meth)acrylate oligomer and mixture thereof. A urethane (meth)acrylate oligomer may be any of the type familiar to the skilled person in either the coatings or the adhesives industries. In general, urethane (meth)acrylate oligomers are usually the reaction products of an isocyanate component containing at least two isocyanate functional groups with a (meth)acrylate component containing at least one (meth)acrylate functional group and at least one group (such as for example hydroxyl or amino) reactive with the isocyanate functional group. Details about urethane (meth) acrylate oligomer can be found for example in US2012/0302695. Mention may be made for example of CN 965, CN 981, CN 9400, CN966H90 commercialized by SARTOMER.

With regard to the polymerization accelerator according to the invention, it may be chosen from those well known by the skilled person in either the coatings or the adhesives industries. Mention may be made for example of tertiary amines such as N,N-dimethyl-p-toluidine (DMPT), N,N-dihydroxyethyl-p-toluidine (DHEPT), organic-soluble transition metal catalysts or mixtures thereof.

With regard to the adhesion promoter according to the invention, it may be chosen from those well known by the skilled person in either the coatings or the adhesives industries. Mention may be made for example of aminosilane, metacryloyl silane, phosphates, methacrylated phosphate ester, epoxidized silane.

With regard to the rheology modifier according to the invention, it may be chosen from those well known by the skilled person in either the coatings or the adhesives industries. Mention may be made for example of silica (in particular fumed silica), micronized amide wax (such as for example CRAYVALLAC series available from Arkema).

With regard to the initiator according to the invention, it may be chosen from those well known by the skilled person in either the coatings or the adhesives industries. Mention may be made for example of peroxides or hydroperoxides (such as for example diacyl peroxides, dialkyl peroxides), peroxy esters, peroxyacetals, azo compounds, and mixtures thereof.

The initiator for starting the polymerization may be chosen from isopropyl carbonate, benzoyl peroxide, lauroyl peroxide, caproyl peroxide, dicumyl peroxide, tert-butyl perbenzoate, tert-butyl per(2-ethylhexanoate), cumyl hydroperoxide, 1,1-di(tert-butylperoxy)-3,3,5-trimethylcyclohexane, tert-butyl peroxyisobutyrate, tert-butyl peracetate, tert-butyl perpivalate, amyl perpivalate, tert-butyl peroctoate, azobisisobutyronitrile (AIBN), azobisisobutyramide, 2,2'-azobis(2,4-dimethylvaleronitrile) or 4,4'-azobis(4-cyanopentanoic). It would not be departing from the scope of the invention to use a mixture of radical initiators chosen from the above list.

The skilled person knows what polymerization accelerator to use in view of the chosen initiator.

In a first preferred embodiment, the initiator is benzoyl peroxide or a dibenzoyl peroxide.

With regard to the diluent according to the invention, it may be chosen from liquid epoxy resins.

With regard to the plasticizer according to the invention, it may be chosen from those well known by the skilled person in either the coatings or the adhesives industries. Mention may be made for example of phthalate based plasticizers, of polyol ester (such as for example pentaerythritol tetravalenate, available from Perstop, of epoxidized oil, and mixtures thereof.

The multistage polymer (MP1) of the composition according to the invention may have at least two stages that are different in its polymer composition.

The multistage polymer (MP1) is preferably in form of polymer particles considered as spherical particles. These particles are also called core shell particles. The first stage forms the core, the second or all following stages the respective shells. Such a multistage polymer which is also called core/shell particle is preferred.

The particles according to the invention, which is the primary particle, it may have a weight average particle size between 15 nm and 900 nm. Preferably the weight average particle size of the polymer is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The primary polymer particles can be agglomerated giving a polymer powder.

The primary polymer particle according to a first preferred embodiment of the invention has a multilayer structure comprising in particular at least one stage (A) comprising a polymer (A1) having a glass transition temperature below 10° C., at least one stage (B) comprising a polymer (B1) having a glass transition temperature over 60° C. and at least one stage (C) comprising a polymer (C1) having a glass transition temperature over 30° C. In this first preferred embodiment the primary polymer particle comprises the components a2) and a3) of the composition according to the invention. The component a2) multistage polymer (MP1) having a core-shell structure, as stage (A) comprising a polymer (A1) having a glass transition temperature below 10° C., at least one stage (B) comprising a polymer (B1) having a glass transition temperature over 60° C. and the component a3) the polymer (C1) as additional stage (C).

Preferably the stage (A) is the first stage of the at least two stages and the stage (B) comprising polymer (B1) is grafted on stage (A) comprising polymer (A1) or another intermediate layer.

There could also be another stage before stage (A), so that stage (A) would also be a shell.

In a first preferred embodiment the polymer (A1) having a glass transition temperature below 10° C. comprises at least 50 wt % of polymeric units coming from alkyl acrylate and the stage (A) is the most inner layer of the polymer particle having the multilayer structure. In other words the stage (A) comprising the polymer (A1) is the core of the polymer particle.

With regard to the polymer (A1) of the first preferred embodiment, it is a (meth)acrylic polymer comprising at least 50 wt % of polymeric units coming from acrylic monomers. Preferably 60 wt % and more preferably 70 wt % of the polymer (A1) are acrylic monomers.

The acrylic momonomer in polymer (A1) may comprise monomers chosen from C1 to C18 alkyl acrylates or mixtures thereof. More preferably acrylic monomer in polymer (A1) comprises monomers of C2 to C12 alkyl acrylic monomers or mixtures thereof. Still more preferably acrylic monomer in polymer (A1) comprises monomers of C2 to C8 alkyl acrylic monomers or mixtures thereof.

The polymer (A1) can comprise a comonomer or comonomers which are copolymerizable with the acrylic monomer, as long as polymer (A1) is having a glass transition temperature of less than 10° C.

The comonomer or comonomers in polymer (A1) are preferably chosen from (meth)acrylic monomers and/or vinyl monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 10° C.

In a specific embodiment polymer (A1) is a homopolymer of butyl acrylate.

More preferably the glass transition temperature Tg of the polymer (A1) comprising at least 70 wt % of polymeric units coming from C2 to C8 alkyl acrylate is between −100° C. and 10° C., even more preferably between −80° C. and 0° C. and advantageously between −80° C. and −20° C. and more advantageously between −70° C. and −20° C.

In a second preferred embodiment, the polymer (A1) having a glass transition temperature below 10° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In a preferred embodiment the core is a butadiene homopolymer.

More preferably the glass transition temperature Tg of the polymer (A1) comprising at least 50 wt % of polymeric units coming from isoprene or butadiene is between −100° C. and 10° C., even more preferably between −90° C. and 0° C., advantageously between −80° C. and 0° C. and most advantageously between −70° C. and −20° C.

In a third preferred embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (B1), mention may be made for example of homopolymers and copolymers comprising monomers with double bonds and/or vinyl monomers. Preferably the polymer (B1) is a (meth)acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, methyl methacrylate, ethyl methacrylate, butyl methacrylate and mixtures thereof, as long as polymer (B1) is having a glass transition temperature of at least 60° C.

Advantageously the polymer (B1) comprises at least 70 wt % of monomer units coming from methyl methacrylate.

Preferably the glass transition temperature Tg of the polymer (B1) is between 60° C. and 150° C. The glass transition temperature of the polymer (B1) is more preferably between 80° C. and 150° C., advantageously between 90° C. and 150° C. and more advantageously between 100° C. and 150° C.

Preferably the polymer (B1) is grafted on the polymer made in the previous stage.

In certain embodiments the polymer (B1) is crosslinked. In one embodiment the polymer (B1) comprises a functional comonomer. The functional copolymer is chosen from acrylic or methacrylic acid, the amides derived from this acids, such as for example dimethylacrylamide, 2-methoxyethyl acrylate or methacrylate, 2-aminoethyl acrylate or methacrylate which are optionally quaternized, polyethylene glycol (meth)acrylates, water soluble vinyl monomers such as N-vinyl pyrrolidone or mixtures thereof. Preferably the polyethylene glycol group of polyethylene glycol (meth) acrylates has a molecular weight ranging from 400 g/mol to 10 000 g/mol.

With regard to the polymer (C1), it may be a copolymer comprising (meth)acrylic monomers. More preferably the polymer (C1) is a (meth)acrylic polymer. Still more preferably the polymer (C1) comprises at least 70 wt % monomers chosen from C1 to C12 alkyl (meth)acrylates. Advantageously preferably the polymer (C1) comprises at least 80 wt % of monomers from C1 to C4 alkyl methacrylate and/or C1 to C8 alkyl acrylate monomers.

Preferably the glass transition temperature Tg of the polymer (C1) is between 30° C. and 150° C. The glass transition temperature of the polymer (C1) is more preferably between 40° C. and 150° C., advantageously between 45° C. and 150° C. and more advantageously between 50° C. and 150° C.

Preferably the polymer (C1) is not crosslinked.

Preferably the polymer (C1) is not grafted on any of the polymers (A1) or (B1).

In one embodiment the polymer (C1) comprises also a functional comonomer.

The functional comonomer has the formula (1)

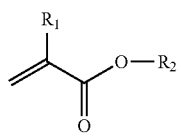

(1)

wherin $R_1$ is chosen from H or $CH_3$ and $R_2$ is H or an aliphatic oraromatic radical having at least one atom that is not C or H.

Preferably the functional monomer is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, polyethylene glycol (meth)acrylates. Preferably the polyethylene glycol group of polyethylene glycol (meth)acrylates has a molecular weight ranging from 400 g/mol to 10 000 g/mol.

In a first preferred embodiment the polymer (C1) comprises from 80 wt % to 100 wt % methyl methacrylate, preferably from 80 wt % to 99.9 wt % methyl methacrylate and from 0.1 wt % to 20 wt % of a C1 to C8 alkyl acrylate monomer. Advantageously the C1 to C8 alkyl acrylate monomer is chosen from methyl acrylate, ethyl acrylate or butyl acrylate.

In a second preferred embodiment the polymer (C1) comprises between 0 wt % and 50 wt % of a functional monomer. Preferably the meth)acrylic polymer (P1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (2) or (3)

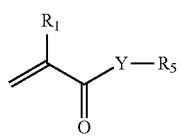

(2)

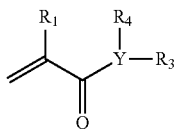

(3)

wherein in both formulas (2) and (3) $R_1$ is chosen from H or $CH_3$; and in formula (2) Y is O, $R_5$ is H or an aliphatic or aromatic radical having at least one atom that is not C or H; and in formula (3) Y is N and $R_4$ and/or $R_3$ is H or an aliphatic or aromatic radical.

Preferably the functional monomer (2) or (3) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth)acrylates, polyethylene glycol (meth)acrylates. Preferably the polyethylene glycol group of polyethylene glycol (meth)acrylates has a molecular weight ranging from 400 g/mol to 10 000 g/mol.

Preferably the polymer (C1) has a mass average molecular weight Mw between 2 000 g/mol and 1 000 00 g/mol.

In a first more preferred embodiment the polymer (C1) has a mass average molecular weight Mw of at least 100 000 g/mol, preferably more than 100 00 g/mol, more preferably more than 105 000 g/mol, still more preferably more than 110 000 g/mol, advantageously more than 120 000 g/mol, more advantageously more than 130 000 g/mol and still more advantageously more than 140 000 g/mol.

The polymer (C1), it may have a mass average molecular weight Mw below 1 000 000 g/mol, preferably below 900 000 g/mol, more preferably below 800 000 g/mol, still more preferably below 700 000 g/mol, advantageously below 600 000 g/mol, more advantageously below 550 000 g/mol and still more advantageously below 500 000 g/mol and most advantageously below 450 000 g/mol.

The mass average molecular weight Mw of polymer (C1) is preferably between 100 000 g/mol and 1 000 000 g/mol, preferably between 105 000 g/mol and 900 000 g/mol more preferably between 110 000 g/mol and 800 000 g/mol advantageously between 120 000 g/mol and 700 000 g/mol, more advantageously between 130 000 g/mol and 600 000 g/mol and most advantageously between 140 000 g/mol and 500 000 g/mol.

In a second more preferred embodiment the polymer (C1) has a mass average molecular weight Mw of less than 100 000 g/mol, preferably less than 90 000 g/mol, more preferably less than 80 000 g/mol, still more preferably less than 70 000 g/mol, advantageously less than 60 000 g/mol, more advantageously less than 50 000 g/mol and still more advantageously less than 40 000 g/mol.

The polymer (C1), has preferably a mass average molecular weight Mw above 2 00 g/mol, preferably above 3000 g/mol, more preferably above 4000 g/mol, still more preferably above 5 000 g/mol, advantageously above 6 000 g/mol, more advantageously above 6 500 g/mol and even more advantageously above 7 000 g/mol, still more advantageously above 10 000 g/mol and most advantageously above 12 000 g/mol.

The mass average molecular weight Mw of the polymer (C1) is preferably between 2 00 g/mol and 100 000 g/mol, preferably between 3 000 g/mol and 90 000 g/mol and more preferably between 4 000 g/mol and 80 000 g/mol advantageously between 5000 g/mol and 70 000 g/mol, more advantageously between 6 000 g/mol and 50 000 g/mol, even more advantageously between 10 000 g/mol and 50 000 g/mol and most advantageously between 10 000 g/mol and 40 000 g/mol.

The mass average molecular weight Mw of the polymer (C1) is chosen according to the first more preferred embodiment or the second more preferred embodiment on function of the acquired viscosity of the composition. If the viscosity has to be low or an additional rheology modifier is present the second more preferred embodiment is preferred. If the viscosity has to be higher or no additional rheology modifier is present the first more preferred embodiment is preferred.

The primary polymer particle according to the invention may be obtained by a multistage process comprising at least two stages. At least the component a) and the component b) are in particular part of a multistage polymer (MP1).

Preferably the polymer (A1) having a glass transition temperature below 10° C. made during the stage (A), is made before stage (B) or is the first stage of the multistage process.

Preferably the polymer (B1) having a glass transition temperature over 60° C. made during the stage (B) is made after the stage (A) of the multistage process.

In a first preferred embodiment the polymer (B1) having a glass transition temperature of at least 30° C. is an intermediate layer of the polymer particle having the multilayer structure.

Preferably the polymer (C1) having a glass transition temperature over 30° C. made during the stage (C) is made after the stage (B) of the multistage process.

More preferably the polymer (C1) having a glass transition temperature over 30° C. made during the stage (C) is the external layer of the primary polymer particle having the multilayer structure. In this case the components a2) and a3) are together as part of the composition (P1).

There could be additional intermediate stages, either between stage (A) and stage (B) and/or between stage (B) and stage (C).

The polymer (C1) and the polymer (B1) are not the same polymer, even if their composition could be very close and some of their characteristics are overlapping. The essential difference is that the polymer (B1) is always part of the multistage polymer (MP1).

This is more explained in the process for preparing the composition according to the invention comprising the polymer (C1) and the multi stage polymer.

The weight ratio r of the polymer (C1) of the external layer comprised in stage (C) in relation to the complete polymer particle comprising multistage polymer (MP1) having a core-shell structure and a polymer (C1) (components a2)+a3)) may be at least 5 wt %, more preferably at least 7 wt % and still more preferably at least 10 wt %.

According to the invention the ratio r of the external stage (C) comprising polymer (C1) in relation to the complete polymer particle comprising multistage polymer (MP1) having a core-shell structure and a polymer (C1) (components a2)+a3)) is preferably at most 30 w %.

Preferably the ratio r of polymer (C1) in view of the primary polymer particle comprising multistage polymer (MP1) having a core-shell structure and a polymer (C1) (components a2)+a3)) is between 5 wt % and 30 wt % and preferably between 5 wt % and 20 wt %.

In a second preferred embodiment the polymer (B1) having a glass transition temperature of at least 30° C. is the external layer of the primary polymer particle having the multilayer structure in other words the multistage polymer (MP1).

Preferably at least a part of the polymer (B1) of layer (B) is grafted on the polymer made in the previous layer. If there are only two stages (A) and (B) comprising polymer (A1) and (B1) respectively, a part of polymer (B1) is grafted on polymer (A1). More preferably at least 50 wt % of polymer (B1) is grafted. The ratio of grafting can be determined by extraction with a solvent for the polymer (B1) and gravimetric measurement before and after extraction to determine the non-grafted quantity.

The glass transition temperature Tg of the respective polymers can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages. The polymer (C1) can be extracted for estimating and measuring the glass transition temperature Tg.

Preferably the polymer composition of the invention comprises no solvents. By no solvents is meant that eventually present solvent make up less than 1 wt % of the composition. The monomers of the synthesis of the respective polymers are not considered as solvents. The residual monomers in the composition present less than 2 wt % of the composition.

Preferably the polymer composition according to the invention is dry. By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The composition according to the invention preferably does not comprise any voluntary added solvent. Eventually residual monomer from the polymerization of the respective monomers and water are not considered as solvents In a variation, the two components a2) the multistage polymer (MP1) having a core-shell structure and a3) the polymer (C1) of the first part composition (P1) form together a polymer composition (PC1), which comprises a) the polymer (A1) having a glass transition temperature of less than 10° C., b) the polymer (B1) having a glass transition temperature of at least 60° C. and c) and the polymer (C1) having a glass transition temperature of at least 30° C. In this variation a) and b) together correspond to component a2) and c) corresponds to a3).

The component c) represents preferably at most 40 wt % of the composition based on a) b) and c). Preferably the component c) represents at most 35 wt % of the composition based on a), b) and c); more preferably at most 30 wt %, still more preferably less than 30 wt %, advantageously less than 25 wt %, more advantageously less than 24 wt % and even more advantageously less than 20 wt %. In other words the ratio r of the polymer (C1) in a composition comprising only the multistage polymer (MP1) and the polymer (C1) is at most 40 wt %, preferably at most 35 wt %; more preferably at most 30 wt %, still more preferably less than 30 wt %, advantageously less than 25 wt %, more advantageously less than 24 wt % and even more advantageously less than 20 wt %.

The component c) represents preferably more than 4 wt % of the composition based on a), b) and c). Preferably the component c) represents more than 5 wt % of the composition based on a), b) and c); more preferably more than 6 wt %, still more preferably more than 7 wt %, advantageously more than 8 wt % and more advantageously more than 10 wt %. In other words the ratio r of the polymer (C1) in a composition comprising only the multistage polymer (MP1) and the polymer (C1) is more than 5 wt %; more preferably more than 6 wt %, still more preferably more than 7 wt %, advantageously more than 8 wt % and more advantageously more than 10 wt %.

The component c) represents preferably between 4 wt % and 40 wt % of the composition based on a) b) and c). Preferably the component c) represents between 5 wt % and 35 wt % of the composition based on a), b) and c); more preferably between 6 wt % and 30 wt %, still more preferably between 7 wt % and less than 30 wt %, advantageously between 7 wt % and less than 25 wt %, more advantageously between 7 wt % and less than 24 wt % and even more advantageously between 10 wt % and less than 20 wt %. In other words the ratio r of the polymer (C1) in a composition comprising only the multistage polymer (MP1) and the polymer (C1) is between 5 wt % and 35 wt %; more preferably between 6 wt % and 30 wt %, still more preferably between 7 wt % and less than 30 wt %, advantageously between 7 wt % and less than 25 wt %, more advantageously between 7 wt % and less than 24 wt % and even more advantageously between 10 wt % and less than 20 wt %.

At least the component a) and the component b) of composition (PC1) are preferably part of a multistage polymer (MP1).

At least the component a) and the component b) are preferably obtained by a multistage process comprising at least two stages; and these two polymer (A1) and polymer (B1) form a multistage polymer (MP1).

With regard to a first preferred method for manufacturing the polymer composition (PC1) according to the invention it comprises the steps of
  a) polymerizing by emulsion polymerization of a monomer or monomer mixture ($A_m$) to obtain one layer in stage (A) comprising polymer (A1) having a glass transition temperature of less than 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in stage (C) comprising a polymer (C1) having a glass transition temperature of at least 30° C.
characterized that the polymer (C1) has a mass average molecular weight Mw of at least 100 000 g/mol and that the component c) represents at most 30 wt % of the composition based on a) b) and c).

Preferably the step a) is made before step b).

More preferably step b) is performed in presence of the polymer (A1) obtained in step a).

Advantageously the first preferred method for manufacturing the polymer composition (PC1) according to the invention is a multistep process comprises the steps one after the other of
  a) polymerizing by emulsion polymerization of a monomer or monomer mixture ($A_m$) to obtain one layer in stage (A) comprising polymer (A1) having a glass transition temperature of less then 10° C.
  b) polymerizing by emulsion polymerization of a monomer or monomer mixture ($B_m$) to obtain layer in stage (B) comprising a polymer (B1) having a glass transition temperature of at least 60° C.
  c) polymerizing by emulsion polymerization of a monomer or monomer mixture (Cm) to obtain a layer in stage (C) comprising a polymer (C1) having a glass transition temperature of at least 30° C.
characterized that the polymer (C1) has a mass average molecular weight Mw of at least 100 000 g/mol.

The respective monomers or monomer mixtures ($A_m$), ($B_m$) and ($C_m$) for forming the layers (A), (B) and (C) respectively comprising the polymers (A1), (B1) and (C1) respectively, are the same as defined before. The characteristics of the polymers (A1), (B1) and (C1) respectively, are the same as defined before.

Preferably the first preferred method for manufacturing the polymer composition according to the invention comprises the additional step d) of recovering of the polymer composition.

By recovering is meant partial or separation between the aqueous and solid phase, latter comprises the polymer composition.

More preferably according to the invention the recovering of the polymer composition is made by coagulation or by spray-drying.

Spray drying is the preferred method for the recovering and/or drying for the manufacturing method for a polymer powder composition according to the present invention if the polymer (A1) having a glass transition temperature below 10° C. comprises at least 50 wt % of polymeric units coming from alkyl acrylate and the stage (A) is the most inner layer of the polymer particle having the multilayer structure.

Coagulation is the preferred method for the recovering and/or drying for the manufacturing method for a polymer powder composition according to the present invention if the polymer (A1) having a glass transition temperature below 10° C. comprises at least 50 wt % of polymeric units coming from isoprene or butadiene and the stage (A) is the most inner layer of the polymer particle having the multilayer structure.

The method for manufacturing the polymer composition according to the invention can comprise optionally the additional step e) of drying of the polymer composition.

Preferably the drying step e) is made if the step d) of recovering of the polymer composition is made by coagulation.

Preferably after the drying step an e) the polymer composition comprises less than 3 wt %, more preferably less than 1.5 wt % advantageously less than 1% of humidity or water.

The humidity of a polymer composition can be measure with a thermo balance.

The drying of the polymer can be made in an oven or vacuum oven with heating of the composition for 48 hours at 50° C.

With regard to a second preferred method for manufacturing the polymeric composition (PC1) comprising the polymer (C1) and the multi stage polymer (MP1), it comprises the steps of
  a) mixing of the polymer (C1) and the multi stage polymer (MP1),
  b) optionally recovering the obtained mixture of previous step in form of a polymer powder,
wherein the polymer (C1) and the multi stage polymer (MP1) in step a) are in form of a dispersion in aqueous phase.

The multi stage polymer (MP1) of the second preferred method for manufacturing the polymeric composition (PC1)

is made according the first preferred method without performing step c) of the said first preferred method.

The quantities of the aqueous dispersion of the polymer (C1) and the aqueous dispersion of the multi stage polymer (MP1) are preferably chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the polymer (C1) and the aqueous dispersion of the multi stage polymer (MP1) are preferably chosen in a way that the weight ratio of the multi stage polymer based on solid part only in the obtained mixture is at most 99 wt %, preferably at most 95 wt % and more preferably at most 90 wt %.

The quantities of the aqueous dispersion of the polymer (C1) and the aqueous dispersion of the multi stage polymer are preferably chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The polymer composition (PC1) is obtained as an aqueous dispersion of the polymer particles, if recovering step b) takes not place. The solid content of the dispersion is preferably between 10 wt % and 65 wt %.

In one embodiment the recovering step b) of the process for manufacturing the polymer composition comprising the polymer (C1) and the multi stage polymer (MP1), is not optional and is preferably made by coagulation or by spray drying.

The process of the second preferred method for manufacturing the polymer composition (PC1) comprising the polymer (C1) and the multi stage polymer can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The second preferred method for manufacturing the polymer composition comprising the polymer (C1) and the multi stage polymer yields preferably to a polymer powder. The polymer powder of the invention is in form of particles. A polymer powder particle comprises agglomerated primary polymer particles made by multistage process and the polymer (C1).

As already mentioned the polymer composition (PC1) according to the invention can also be in form of larger polymer particles: a polymer powder. The polymer powder particle comprises agglomerated primary polymer particles made by the multistage process according the first preferred method or agglomerated primary polymer particles made by blending the multistage polymer (MP1) obtained multistage process with polymer particles made of polymer (C1) according the second preferred method.

With regard to the polymer powder of the invention, it may have a volume median particle size D50 between 1 μm and 500 μm. Preferably the volume median particle size of the polymer powder is between 10 μm and 400 μm, more preferably between 15 μm and 350 μm and advantageously between 20 μm and 300 μm.

The D10 of the particle size distribution in volume is preferably at least 7 μm and preferably 10 μm.

The D90 of the particle size distribution in volume is preferably at most 500 μm and preferably 400 μm, more preferably at most 250 μm.

In one embodiment, the composition suitable as (meth) acrylic adhesive composition comprises:
a) a first part composition (P1) comprising:
   a1) at least one (meth)acrylic monomer (M1), at least one of said monomer (M1) being methyl methacrylate;
   a2) a multistage polymer (MP1) having a core-shell structure as defined above;
   a3) a polymer (C1) as defined above;
   a4) at least one urethane (meth)acrylate oligomer;
   a5) optionally at least one monomer (M2);
   a6) a polymerization accelerator;
   the content of the multistage polymer (MP1) in the first part composition being preferably comprised from 11 wt % to 20 wt %, more preferably from 13 wt % to 18 wt %, advantageously from 15 wt % to 18 wt %;
b) a second part composition (P2) comprising:
   b1) at least one polymerization initiator.

In one embodiment, the composition suitable as (meth) acrylic adhesive composition comprises:
a) a first part composition (P1) comprising:
   a1) a mixture of (meth)acrylic monomers (M1), at least one of said monomers (M1) being methyl methacrylate, preferably the mixture comprising methyl methacrylate and tridecyl acrylate;
   a2) a multistage polymer (MP1) having a core-shell structure as defined above;
   a3) a polymer (C1) as defined above;
   a4) at least one urethane (meth)acrylate oligomer;
   a5) optionally at least one monomer (M2);
   a6) a polymerization accelerator;
   the content of the multistage polymer (MP1) in the first part composition being preferably comprised from 11 wt % to 20 wt %, more preferably from 13 wt % to 18 wt %, advantageously from 15 wt % to 18 wt %;
b) a second part composition (P2) comprising:
   b1) at least one polymerization initiator.

In one embodiment, the composition suitable as (meth) acrylic adhesive composition comprises:
a) a first part composition (P1) comprising:
   a1) at least one (meth)acrylic monomer (M1), at least one of said monomer (M1) being methyl methacrylate;
   a2) a multistage polymer (MP1) having a core-shell structure as defined above;
   a3) a polymer (C1) as defined above;
   a4) at least one urethane (meth)acrylate oligomer;
   a5) at least one monomer (M2) selected from the group consisting of 2(2-ethoxyethoxy)ethyl acrylate and methoxy polyethylene glycol methacrylate;
   a6) a polymerization accelerator;
   the content of the multistage polymer (MP1) in the first part composition being preferably comprised from 11 wt % to 20 wt %, more preferably from 13 wt % to 18 wt %, advantageously from 15 wt % to 18 wt %;
b) a second part composition (P2) comprising:
   b1) at least one polymerization initiator.

Methods of Evaluation

Glass Transition Temperature

The glass transitions (Tg) of the polymers (of the multistage polymer) are measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation.

The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multistage polymerization is measured with a Zetasizer.

The particle size of the polymer powder after recovering is measured with Malvern Mastersizer 3000 from MALVERN.

For the estimation of weight average powder particle size, particle size distribution and ratio of fine particles a Malvern Mastersizer 3000 apparatus with a 300 mm lenses, measuring a range from 0,5-880 µm is used.

Tensile Strength

The tensile specimens were tested with a cross-head speed of 10 mm/min at 23° C. The samples were held using mechanical jaws. The tensile Modulus (E), tensile stress and strain were measured at break and at yield point according to the ISO 527-2 standard requirements, using dog bone specimens.

Charpy Impact Tests

The length of the Charpy specimens was 80 mm, a thickness of 4 mm and a width of 10 mm, following the ISO 179 standard requirement (type 1). Specimens were notched using an automatic CEAST NotchVis device. This notching machine equipment was fitted with a cobalt steel knife with a V notch of (45°±1°) and a radius r=(0.25±0.05) mm. The notch depth was 0.8 mm.

The Charpy impact tests were carried out using a Zwick I pendulum impact tester fitted with a 233 grams hammer. The results presented are the average of 7 tested specimens.

Dispersion of Multistage Polymer (Core/Shell Powder) Assessment

The composition comprising the multistage polymer (core/shell powder) is tested for dispersion easiness in the neat methyl methacrylate. This was evaluated by visual inspection as the time requested to reach a homogeneous dispersion state for the core/shell when added to methacrylate part (first stage of the part A methacrylate composition preparation). In particular, attention was paid to the total disappearance of any core/shell powder agglomerates. A poor result regarding this test was qualified as difficult and long whereas a good result was qualified as easy and fast.

PTFE molds were used for directly prepare tensile test and charpy impact strength specimens.

A Heidolph RZR 2051 stirring motor used at a speed rotation of 200 rpm and fitted with a dispersive blade was used for the blending process of the different ingredients of the two parts methacrylate adhesive formulation at room temperature.

The lap-shear and tensile tests were carried out using an Instron tensile testing machine fitted respectively with a 50 kN and 5 kN force sensor. An extensometer was used for the initial stage of the tensile test to assess the tensile modulus (E) with higher accuracy.

The aluminum plates used as substrate to prepare the lap shear specimens were made of a 6061 alloy. A constant thickness of the adhesive layer was ensured by the use of PTFE film spacer around the bounding area. The PTFE films were 250 µm thick and were purchased from Multi-Labo. Once bonded, the plates were held together with 40 mm bulldog clips to maintain the bounded plates during the curing step.

Lap-Shear Aluminum Plates Surface Preparation

The lap-shear sample are made from two aluminum plates, an adhesive layer with a standardized thickness (200 microns) and a clamping device. The surface preparation protocol of the plates used for the Lap shear test is key for the reliability of the test results. The different preparation steps used were the following: (i) water cleaning, (ii) acetone cleaning and finally (iii) surface abrasion.

The water cleaning consisted of rubbing with a damp while acetone cleaning was done by rubbing with an impregnated rag. A fine surface abrasion process as described in the EN13887 standard was performed using R222 Emery clothe sheet grit 180 from Norton Saint Gobain: the surface was abraded along the main plate axis until it became totally bright. Then, it was abraded perpendicularly until the first abrasion marks became invisible. Finally, the plates were abraded circularly until the first two steps marks became invisible. The dust was removed by compressed dry air.

Aluminum Plates Bounding Step

A Teflon film was used as a spacer between the 2 plates to ensure a regular thickness for the adhesive layer. According to the EN 1465 standard, the overlapping adhesion surface was 12.5 mm×25 mm×2 mm.

A small quantity of adhesive composition is deposited and leveled using a spatula at the surface of the extremity of one of the two aluminum plates. During this step, the Teflon spacer is held manually, to avoid movement. The second aluminum plate is pressed against the first one to ensure the right overlapping bounding area. The two plates are clamped together using 2 bulldog clips. Clips are removed when the curing process is finished. The curing protocol used for the lap-shear samples is the same as for the curing of the methacrylate specimens described hereafter.

Lap-Shear Testing Protocol

The shear adhesive strength of the lap-shear specimens was evaluated using an Instron tensile test machine at 23° C., in accordance with EN 1465 standard requirements. The cross-head speed was 5 mm/min. The samples were held using mechanical jaws. The applied stress and the resulting strain were measured until the break. The results are the average values of 5 tested specimens.

Examples

Example 1: Synthesis of Multistage Polymer Particles

First stage A—polymerisation of a polymer type A1: To a 20 litres high-pressure reactor was charged: de-ionized water 116.5 parts, emulsifier potassium salt of beef tallow fatty acid 0.1 part, 1,3-butadiene 21.9 parts, t-dodecyl mercaptan 0.1 parts, and p-menthane hydroperoxide 0.1 parts as an initial kettle charge. The solution was heated, with agitation, to 43° C. at which time a redox-based catalyst solution was charged (water 4.5 parts, sodium tetrapyrophosphate 0.3 parts, ferrous sulphate 0.004 parts and dextrose 0.3 parts), effectively initiating the polymerization. Then the solution was further heated to 56° C. and held at this temperature for a period of three hours. Three hours after polymerization initiation, a second monomer charge (77.8 parts BD, t-dodecyl mercaptan 0.2 parts), one-half of an additional emulsifier and reductant charge (de-ionized water 30.4 parts, emulsifier potassium salt of beef tallow fatty acid 2.8 parts, dextrose 0.5 parts) and additional initiator (p-menthane hydroperoxide 0.8 parts) were continuously added over eight hours. Following the completion of the second monomer addition, the remaining emulsifier and reductant charge plus initiator was continuously added over an additional five hours. Thirteen hours after polymerization initiation, the solution was heated to 68° C. and allowed to react until at least twenty hours had elapsed since polymerization initiation, producing polybutadiene rubber latex, R1. The resultant polybutadiene rubber latex (A1) contained 38% solids and had a weight average particle size of about 160 nm.

Second stage B—Polymerization of polymer type B1: into a 3.9 litres reactor was charged 75.0 parts, on a solids basis, of polybutadiene rubber latex R1, 37.6 parts de-ionized water, and 0.1 parts sodium formaldehyde sulfoxylate. The solution was agitated, purged with nitrogen, and heated to 77° C. When the solution reached 77° C., a mixture of 22.6 parts methyl methacrylate, 1.4 parts divinyl benzene and 0.1 parts t-butyl hydroperoxide initiator was continuously added over 70 minutes, followed by o hold period of 80 minutes. Thirty minutes after the onset of the hold period, 0.1 parts of sodium formaldehyde sulfoxylate and 0.1 parts t-butyl hydroperoxide were added to the reactor at once. Following the 80-minute hold period, a stabilization emulsion was added to the graft copolymer latex. The stabilization emulsion was prepared by mixing 3.2 parts de-ionized water (based on graft copolymer mass), 0.1 parts oleic acid, 0.1 parts potassium hydroxyde, and 0.9 parts octadecyl-3-(3,5-di-tertbutyl-4-hydroxyphenyl) propionate. The resultant core shell polymer (A+B) had a weight average particle size of about 180 nm.

Third Stage C—Polymerization of Polymer Type C1

Synthesis of the polymer C1: semi continuous process: charged into a reactor, with stirring, were 10 000 g of core shell polymer (A+B) in de-ionized water, 0.01 g of FeSO4 and 0.032 g of ethylenediaminetetraacetic acid, sodium salt (dissolved in 10 g of de-ionized water), 3.15 g of sodium formaldehydesulfoxylate dissolved if 110 g of de-ionized water and 21.33 g of emulsifier potassium salt of beef tallow fatty acid (dissolved in 139.44 g of water), and the mixture was stirred until complete dissolution of added raw materials exept core-shell polymer. Three vacuum-nitrogen purges were carried out in succession and the reactor left under a slight vacuum. The reactor was then heated. At the same time, a mixture comprising 1066.7 g of methyl methacrylate and 10.67 g of n-octyl mercaptan was nitrogen-degassed for 30 minutes. The reactor is heated at 63° C. and maintained at that temperature. Next, the monomers mixture was introduced into the reactor in 180 min using a pump. In parallel, a solution of 5.33 g of ter-butyl hydroperoxide (dissolved in 100 g of de-ionized water) is introduced (same addition time). Then the lines was rinsed with 50 g and 20 g of water. Then the reaction mixture was heated at a temperature of 80° C. and the polymerization was then left to completion for 60 minutes after the end of the monomers addition. The reactor was cooled down to 30° C. The mass average molecular weight of the copolymer C1 is $M_w$=28 000 g/mol.

The final polymer composition consisting of the multi-stage polymer (MP1) and polymer (C1) was then recovered, the polymer composition being dried by spray drying giving a power of core/shell-2.

Comparative Example

The Same Syntheses were Made is in example 1, however the third stage C was not made. A powder of core/shell-1 is obtained

TABLE 1

| Part A composition containing the methacrylate monomers | | |
|---|---|---|
| Ingredient | Supplier | Content (%) |
| Methyl methacrylate (MMA) | Arkema | 42 |
| Core/Shell powder | Arkema | 20 |
| 2-Ethylhexyl acrylate (2EHA) | Arkema | 4 |
| Hydroxyethyl methacrylate (HEMA) | Arkema | 4 |
| SIS copolymer D1160 | Kraton Polymers | 8 |
| Urethane diacrylate CN981 | Sartomer | 13 |
| Methacrylic acid (MAA) | Arkema | 4 |
| Firstcure DMPT polymerization accelerator | Abermarle | 1 |
| Adhesion promoter methacrylated phosphate ester Genorad 40 | Rahn | 2 |
| Fumed treated silica Aerosil R7200 | Evonik | 2 |

42 g of methyl methacrylate (MMA) were poured into a 250 ml beaker. 20 g of core/shell powder additive were added to the MMA under 200 rpm continuous stirring during 15 m. Then 4 g of 2EHA, 4 g of HEMA, 13 g of CN981, 2 g of Genorad 40 and 4 g of M4AA were added and stirred again during 15 min. Finally 8 g of D1160 and 2 g of R7200 were added under stirring during 45 m. The resulting homogeneous part A composition was kept in a sealed container.

TABLE 2

| Part B composition including the polymerization initiator | | | |
|---|---|---|---|
| Ingredient | Function | Supplier | Content (%) |
| 50% Benzoyl peroxide paste RETIC BP50 white | Polymerization initiator | Arkema | 40 |
| Liquid epoxy DGEBA resin Araldite LY556 | Reactive diluent | Huntsman | 22 |
| Benzyl butyl phthalate | Plasticizer | Sigma-Aldrich | 20 |
| Epoxidized silane CoatOSil 1770 | Adhesion promoter | Momentive Performance Materials | 5 |
| Fumed treated silica Aerosil R7200 | Rheology modifier | Evonik | 13 |

22 g LY556 resin were poured into a 250 ml beaker together with 40 g of BP50, 20 g of Benzyl Butyl phthalate, 5 g of CoatOSil 1770 and finally 13 g of R7200 under continuous stirring during 30 min at 500 rpm. The resulting homogeneous part B composition was kept in a sealed container.

The methacrylate part A composition and the polymerization initiator part B composition were mixed together in a 10:1 ratio (10 parts of part A per 1 part of part B) under 1200 rpm stirring during 1 min.

The resulting homogeneous methacrylate adhesive mixture was poured into the above-described PTFE molds to be cured at room temperature during 24 hours. The same adhesive mixture was used to prepare the Lap-Shear specimens using the same curing conditions. The resulting core/shell content of this adhesive formulation is 18.2 wt %.

It should be noted that a reference "neat resin" composition was simply prepared using the same above-described protocol but without adding the core/shell powder to the part A composition (0 wt % core/shell composition).

The applicative results corresponding to example 1 are reported in Table 3. It can be concluded that the innovative Core/Shell 2 of the present invention provides superior performance than the standard Core/Shell 1 reference in the present methacrylate adhesive formulation. More particularly, Core/Shell 2 allows to reach higher strengthening effect (Charpy impact strength), shear stress (Lap-Shear test) and elongation at break while less increasing the viscosity of the host methacrylate resin when compared to Core/Shell 1. The elastic modulus loss always observed when a rubber phase is introduced in a rigid matrix like this methacrylate system, remains reasonable in the case of Core/Shell 2, when taking into account the relatively high amount of core/shell incorporation in the adhesive formulation (18.2 wt %). Because core/shell 2 is a non-reactive core/shell, it will not sensitively affect the glass transition temperature (Tg) of the host methacrylate matrix.

TABLE 3 applicative results corresponding to the examples

| | Comparative Example 1 Neat Resin | Comparative Example 2 Core/Shell 1 | Inventive Example 1 Core/Shell 2 |
|---|---|---|---|
| Core/shell content | 0 wt % | 18.2 wt % | 18.2 wt % |
| Core/shell dispersion in MMA | NA | Difficult/Slow with residual agglomerates and high viscosity | Easy/Fast no residual agglomerate and lower viscosity (vs Core/Shell 1) |
| E modulus (MPa) | 1468 +/− 72 | 877 +/− 59 | 902 +/− 62 |
| Elongation at break (%) | 16 +/− 4 | 56 +/− 8 | 85 +/− 11 |
| Stress at break (MPa) | 18 +/− 6 | 21 +/− 7 | 24 +/− 9 |
| Charpy Impact Strength (kJ/m$^2$) | 6 +/− 0.3 | 8.7 +/− 0.4 | 12.1 +/− 0.3 |
| Shear Strength adhesion (MPa) | 22.8 +/− 1.4 | 23.9 +/− 1.5 | 28.9 +/− 1.2 |

Three other formulations F1, F2 and F3 were made by mixing the different ingredients as mentioned above

F1

| Part A | Wt % in part A | grams | Part B | Wt % in part B | grams |
|---|---|---|---|---|---|
| MMA (ARKEMA) | 50.3 | 12.6 | Retic 50 | 100 | 0.5 |
| Core/shell 2 (as prepared above) | 17.6 | 4.4 | | | |
| Aerosil HDKN 20 (wacker) | 7.0 | 1.75 | | | |
| SR 489 (monomer from Sartomer) | 10.0 | 2.5 | | | |
| Urethane diacrylate CN 981 (sartomer) | 15.0 | 3.75 | | | |
| DMPT polymerization accelerator | 0.1 | 0.025 | | | |
| TOTAL | 100 | 25.025 | TOTAL | 100 | 0.5 |

F2

| Part A | Wt % in part A | grams | Part B | Wt % in part B | grams |
|---|---|---|---|---|---|
| MMA (ARKEMA) | 53.0 | 13.3 | Retic 50 | 100 | 0.5 |
| Core/shell 2 (as prepared above) | 14.9 | 3.7 | | | |
| Aerosil HDKN 20 (wacker) | 7.0 | 1.75 | | | |
| SR 489 (monomer from Sartomer) | 10.0 | 2.5 | | | |
| Urethane diacrylate CN 981 (sartomer) | 15.0 | 3.75 | | | |
| DMPT polymerization accelerator | 0.1 | 0.025 | | | |
| TOTAL | 100 | 25.025 | TOTAL | 100 | 0.5 |

F3

| Part A | Wt % in part A | grams | Part B | Wt % in part B | grams |
|---|---|---|---|---|---|
| MMA (ARKEMA) | 54.3 | 13.6 | Retic 50 | 100 | 0.5 |
| Core/shell 2 as prepared above | 13.6 | 3.4 | | | |
| Aerosil HDKN 20 (WACKER) | 7.0 | 1.75 | | | |
| SR 489 (monomer from Sartomer) | 10.0 | 2.5 | | | |

-continued

F3

| | Part A | | Part B | |
|---|---|---|---|---|
| | Wt % in part A | grams | Wt % in part B | grams |
| Urethane diacrylate CN 981 (SARTOMER) | 15.0 | 3.75 | | |
| DMPT polymerization accelerator | 0.1 | 0.025 | | |
| TOTAL | 100 | 25.025 | TOTAL | 100 | 0.5 |

The results of tensile strength (MPa) and elongation at break are provided in the following table:

| Formulation | Tensile strenght (MPa) | Elongation at break (%) |
|---|---|---|
| Reference | 39.00 | 7.00 |
| F1 | 17.98 | 208.60 |
| F2 | 18.90 | 151.50 |
| F3 | 15.00 | 100.00 |

The measurement of the elongation at break by traction test was carried out according to the following protocol:
The measurement consists in stretching in a test machine having a movable jaw moving with a constant speed of 100 mm/min, a standard test specimen made of the cured composition and to register, at the moment of the break of said specimen, its elongation (in %). The standard specimen is in form of dumbbell, as illustrated in the international norm ISO 37 of 2011. The narrow part of the dumbbell has 20 mm in length, 4 mm in width, and a thickness of 500 µm.

The reference is a formulation similar to formulations F1, F2 and F3, but without any core/shell 2.
The inventive formulations F1, F2 and F3 advantageously exhibit a good comprise between a good tensile strength and a high elongation at break.

A cartridge 10/1 (10 part of A and 1 part of B, 10/1 in volume) has been prepared according to a similar process than disclosed above:

Cartridge 10/1

| | Part A | Part B | |
|---|---|---|---|
| | grams | | grams |
| MMA (ARKEMA) | 48.6 | RETIC 50 Pevalen | 2.17 |
| Core/shell 2 as prepared above | 12.2 | | 3.29 |
| Aerosil HDKN 20 (WACKER) | 9.8 | Aerosil HDKN 20 | 0.33 |
| SR 256 (monomer from Sartomer) | 10.0 | MMA | 4.22 |
| Urethane diacrylate CN 981 (SARTOMER) | 6.6 | | |
| Urethane diacrylate CN 9400 (SARTOMER) | 16.3 | | |

Cartridge 10/1

| | Part A | Part B | |
|---|---|---|---|
| | grams | | grams |
| DMPT polymerization accelerator | 0.2 | | |
| TOTAL | 100 | 25.025 | TOTAL | 100 | 0.5 |

The cartridge comprises a static mixer which allows the mixing of part A and part B by the end user.

A tensile strength of 19 MPa and an elongation at break of 140% were obtained with this formulation.

The invention claimed is:

1. A polymer composition suitable as (meth)acrylic adhesive composition comprising,
 a) a first part composition (P1) comprising,
  a1) at least (meth)acrylic monomer (M1),
  a2) a multistage polymer (MP1) having a core-shell structure in an amount of from 10 wt % to 20 wt % of a sum of all components of said first part composition (P1),
  a3) a polymer (C1), wherein the polymer (C1) is a (meth)acrylic polymer, and
  wherein the ratio r of polymer (C1) in a composition comprising only multistage polymer (MP1) and polymer (C1) is at most 30 wt %, said polymer (C1) has a glass transition temperature Tg between 40° C. and 150° C., and
 b) a second part composition (P2) comprising,
  b1) a polymerization initiator,
  wherein polymer (C1) has a mass average molecular weight Mw of at least 105.000 g/mol and below 550,000 g/mol.

2. The composition according to claim 1, wherein polymer (C1) has a mass average molecular weight Mw between 130,000 g/mol and below 550,000 g/mol.

3. The composition according to claim 1, wherein polymer (C1) has a mass average molecular weight Mw between 140,000 g/mol and 500,000 g/mol.

4. The composition according to claim 1 wherein the ratio r of the polymer (C1) in a composition comprising only the multistage polymer (MP1) and the polymer (C1) is between 5 wt % and 30 wt %.

5. The polymer composition according to claim 1 wherein the polymer (C1) comprises at least 80 wt % of monomers C1 to C4 alkyl methacrylate and/or C1 to C8 alkyl acrylate monomers.

6. The polymer composition according to claim 1 wherein polymer (C1) comprises a functional comonomer.

7. The polymer composition according to claim 6, wherein the functional comonomer is chosen from glycidyl (meth)acrylate, acrylic or methacrylic acid, the amides derived from these acids, dimethylacrylamide, 2-methoxyethyl acrylate or methacrylate, 2-aminoethyl acrylates or methacrylates optionally quaternized, and polyethylene glycol (meth)acrylates.

8. The polymer composition according to claim 1 wherein the (meth)acrylic monomer (M1) is chosen from acrylic acid, methacrylic acid, alkyl acrylic monomers, alkyl methacrylic monomers and mixtures thereof, the alkyl group of said alkyl acrylic monomers and said alkyl methacrylic monomers having from 1 to 22 carbons, and being either linear, branched or cyclic.

9. The polymer composition according to according to claim 1 wherein the first part composition (P1) comprises one more additional compound which is at least one monomer (M2) different from (meth)acrylic monomer (M1).

10. The polymer composition according to claim 9 wherein monomer (M2) is chosen from acrylic ester monomers or methacrylic ester monomers that have at least one atom that is not a carbon or hydrogen in the group of the alcohol part of the ester.

11. The polymer composition according to claim 9 wherein monomer (M2) is chosen from the group consisting of: 2-hydroxyethyl acrylate, 2-hydroxyethyl methacrylate, 2- and 3-hydroxypropyl acrylate, 2- and 3-hydroxypropyl methacrylate, 2-methoxyethyl acrylate, 2-methoxyethyl methacrylate, 2-ethoxyethyl acrylate, 2-ethoxyethyl methacrylate, 2- or 3-ethoxypropyl acrylate, 2- or 3-ethoxypropyl methacrylate, 2(2-ethoxyethoxy)ethyl acrylate, methoxy polyethylene glycol methacrylate, methoxy polyethylene glycol acrylate, polyethylene glycol methacrylate, polyethylene glycol acrylate, polypropylene glycol methacrylate, polypropylene glycol acrylate, and mixtures thereof.

12. The polymer composition according to claim 1 wherein the first part composition (P1) comprises one more additional compound which is a flexibilizer.

13. The polymer composition according to claim 12 wherein the flexibilizer is chosen from the group consisting of block copolymers and liquid elastomers.

14. The polymer composition according to claim 12 wherein the flexibilizer is chosen from urethanes oligomers.

15. The composition according to claim 1, wherein the first part composition (P1) comprises:
   a1) at least one (meth)acrylic monomer (M1), at least one of said monomer (M1) being methyl methacrylate;
   a2) the multistage polymer (MP1) having a core-shell structure;
   a3) the polymer (C1);
   a4) at least one urethane (meth)acrylate oligomer;
   a5) optionally at least one monomer (M2); and
   a6) a polymerization accelerator;
   the content of the multistage polymer (MP1) in the first part composition being comprised of from 11 wt % to 20 wt %.

16. The composition according to claim 1, wherein the first part composition (P1) comprises:
   a1) a mixture of (meth)acrylic monomers (M1), at least one of said monomers (M1) being methyl methacrylate:
   a2) the multistage polymer (MP1) having a core-shell;
   a3) the polymer (C1) as defined above;
   a4) at least one urethane (meth)acrylate oligomer;
   a5) optionally at least one monomer (M2); and
   a6) a polymerization accelerator;
   the content of the multistage polymer (MP1) in the first part composition being comprised of from 11 wt % to 20 wt %.

17. The composition according to claim 1, wherein the first part composition (P1) comprises:
   a1) at least one (meth)acrylic monomer (M1), at least one of said monomer (M1) being methyl methacrylate;
   a2) the multistage polymer (MP1) having a core-shell structure as defined above;
   a3) the polymer (C1);
   a4) at least one urethane (meth)acrylate oligomer;
   a5) at least one monomer (M2) selected from the group consisting of 2(2-ethoxyethoxy)ethyl acrylate and methoxy polyethylene glycol methacrylate; and
   a6) a polymerization accelerator;
   the content of the multistage polymer (MP1) in the first part composition being comprised of from 11 wt % to 20 wt %.

* * * * *